(12) United States Patent
Sharon et al.

(10) Patent No.: US 6,205,122 B1
(45) Date of Patent: Mar. 20, 2001

(54) AUTOMATIC NETWORK TOPOLOGY ANALYSIS

(75) Inventors: Azulai Sharon, Sunnyvale, CA (US); Ran Levy, Herzliya (IL); Yaacov Cohen, Petah Tikva (IL); Alexander Haiut, Tel Aviv (IL); Ariel Stroh, Kfar Saba (IL); David Raz, Nes-Ziona (IL)

(73) Assignee: Mercury Interactive Corporation, Sunnyvale, CA (US)

( * ) Notice: Subject to any disclaimer, the term of this patent is extended or adjusted under 35 U.S.C. 154(b) by 0 days.

(21) Appl. No.: 09/285,099

(22) Filed: Apr. 2, 1999

Related U.S. Application Data

(60) Provisional application No. 60/093,646, filed on Jul. 21, 1998.

(51) Int. Cl.[7] .................. G06F 15/177; G06F 15/173; H04L 12/28; H04L 12/56
(52) U.S. Cl. .................. 370/254; 370/389; 370/401; 709/220; 709/223; 709/238
(58) Field of Search .................. 370/254, 255, 370/400, 401, 402, 403, 408, 389; 709/220, 223, 238

(56) References Cited

U.S. PATENT DOCUMENTS

| | | | | |
|---|---|---|---|---|
| 5,241,625 | * | 8/1993 | Epard et al. | 395/163 |
| 5,297,138 | * | 3/1994 | Black | 370/254 |
| 5,546,540 | * | 8/1996 | White | 370/254 |
| 5,606,664 | * | 2/1997 | Brown et al. | 395/200.1 |
| 5,684,796 | * | 11/1997 | Abidi et al. | 370/389 |
| 5,706,440 | * | 1/1998 | Compliment et al. | 370/401 |
| 5,708,772 | * | 1/1998 | Zeldin et al. | 395/183.01 |
| 5,710,885 | * | 1/1998 | Bondi | 395/200.54 |
| 5,715,396 | * | 2/1998 | Chatwani et al. | 395/200.15 |
| 5,734,824 | * | 3/1998 | Choi | 395/200.11 |
| 5,845,081 | * | 12/1998 | Rangarajan et al. | 395/200.54 |
| 5,850,397 | * | 12/1998 | Raab et al. | 370/397 |

* cited by examiner

*Primary Examiner*—Michael Horabik
*Assistant Examiner*—Kevin C. Harper
(74) *Attorney, Agent, or Firm*—Mark M. Friedman

(57) ABSTRACT

A system and a method for automatic detection of physical network topology, by correlating information from computers connected to the network. Preferably, this information is gathered through the operation of a plurality of agents, which are distributed throughout the network and which are operated by a computer connected to the network. More preferably, the agents exchange information in order to at least partially determine the physical topology of the network. In addition, information is preferably gathered from other sources of physical topology information, such as bridging tables from network switches. The physical topology is preferably built by first determining the relative location of the agents, such as the segment of the network on which the agent is located. Next, switches and other connectivity elements are added in order to connect these segments, and additional segments are created from other sources of information. The remaining connections are then determined. Thus, the method and system of the present invention enable the map of the physical topology of the network to be automatically constructed.

36 Claims, 4 Drawing Sheets

AUTOMATIC NETWORK TOPOLOGY ANALYSIS

This Application is a Continuation-in-Part application of U.S. Provisional Application No. 60/093,646, filed on Jul. 21, 1998.

FIELD AND BACKGROUND OF THE INVENTION

The present invention relates to a system and method for automatically detecting and analyzing the physical topology of a network, and in particular, for such a system and method in which software agents are distributed throughout the network in order to gather information about the physical topology local to each agent.

Networks, including local area networks (LAN) and wide area networks (WAN), are becoming increasingly prevalent as the number of computers in organizations grows. Networks enable information to be shared between computers, and as such are important for the case and convenience of storing and accessing data throughout an organization. Networks are implemented with a physical connection between at least two computers or other network hardware devices. This physical connection can be implemented through various types of physical connection media, including but not limited to, a cable or wireless communication, including optical, infra-red and radiowave based signals. Data is passed through this physical connection according to various protocols at different layers of the network. These protocols include but are not limited to, transmission control protocol (TCP), internet protocol (IP), internet packet exchange (IPX), systems network architecture (SNA), datagram delivery protocol (DDP) and so forth. At the data link layer, such protocols include, but are not limited to, Ethernet, token ring, fiber distributed data interface (FDDI) and so forth.

All of these different types of physical media and protocols increase the flexibility and power of network transport, thereby enabling networks to become larger and more complex. However, as networks become more complex, managing these networks becomes more difficult. Indeed, simply determining the physical topology of the network can be quite difficult. For example, if a computer having a network card with a particular MAC address is moved from one physical location to a different physical location, the physical topology of the network is changed. Such a change can have unpredictable effects for the management of traffic flow through the network. If the network administrator is not notified of this change, the source of these unpredictable effects can be difficult to locate.

In order to help the network administrator detect and manage these changes to the physical topology of the network, various solutions have been proposed in the background art. For example, U.S. Pat. No. 5,710,885 discloses a network management system for monitoring nodes in a network. This system features a central network management station which sends out polling messages to the nodes according to the IP (internet protocol) address of each node. If a node does not respond within a predetermined period of time, the node is determined to have failed. The disclosed method has the drawback of only being suitable for confirming the existence of a node at a particular IP address, such that the method would not be useful for de novo determination of the topology of a network.

Similarly, U.S. Pat. No. 5,845,081 discloses a method for detecting the existence of a network by a computer which communicates with the network through a different network protocol than that of the network itself. The computer communicates with one or more nodes in the network in order to receive information about the topology of the network. Again, the disclosed method would not be useful for de novo determination of the topology of a network.

In an attempt to provide a solution for the de novo determination of the physical topology of a network, U.S. Pat. No. 5,715,396 discloses a method for automatic topology discovery in an ATM (asynchronous transfer mode) network. According to this method, each network switch transmits messages through each port. Neighboring switches which receive these messages forward them to a topology manager which constructs a network topology profile according to the received messages. Unfortunately, this method suffers from the drawback of being restricted to switches, thereby ignoring other network components such as computers. Since a principle goal of network management is to provide more efficient traffic flow to computers on the network, such a drawback significantly reduces the usefulness of the disclosed method. Thus, although the disclosed method may be useful for ATM networks, which transmit information through the network in fixed-length cells, this method is not generally useful for the automatic discovery of the physical topology of a network.

U.S. Pat. No. 5,606,664 discloses an apparatus of limited utility for automatically determining the topology of a LAN, also described as a "concentrator" hardware device. First, the disclosed apparatus is only useful for local area networks, but cannot be employed to detect wide area networks or combinations of LAN and WAN in a network, for example. Furthermore, the apparatus is limited to the detection of network devices which are physically connected to it, which is again of restricted utility. Thus, the disclosed apparatus is not generally useful for the automatic discovery of the physical topology of a network.

U.S. Pat. No. 4,684,796 discloses an extended method for automatic topology discovery using the apparatus disclosed in U.S. Pat. No. 5,606,664, in which each "concentrator" hardware device in a network includes a network management module. This module sends a "hello data packet" to each unique network segment associated with that particular concentrator device. This data packet includes information identifying the unique segment on which the packet is being sent. The physical topology of the network is then determined according to the recipients of each packet. However, the disclosed method has the disadvantage of requiring specialized concentrator hardware devices and of requiring the basic determination of the network topology as a plurality of network segments to be performed before the topology to be determined. Thus, the disclosed method is also not generally useful for the automatic discovery of the physical topology of a network.

U.S. Pat. No. 5,708,772 discloses a method for determining the topology of a network by receiving signals from source hubs in the network, including information concerning destination hubs and the ports of the source hubs to which these destination hubs are connected. As for the methods described previously for U.S. Pat. No. 4,684,796 and U.S. Pat. No. 5,606,664, this method depends upon the use of specialized hardware apparatus. Furthermore, the method concentrates upon connections through particular network components, rather than determining the physical topology by focusing on the connections to the computers themselves. U.S. Pat. No. 5,734,824, which discloses a method for discovering network topology for local area networks connected through transparent bridges, suffers from similar drawbacks. Thus, these methods are still not suitable for general automatic discovery of physical network topology.

U.S. Pat. No. 5,850,397 discloses a method for automatic detection of the topology of a mixed-media network. According to this method, the mixed-media network is divided into groups of devices which support a common topology mechanism and which are described as "spheres". The topology is determined for devices within each sphere, and then additional spheres are connected until the topology of the entire network is known. Unfortunately, this method has the disadvantage of requiring the division of the network into different "spheres" before the disclosed method can be performed, such that the method is not useful for de novo detection of the physical topology of a network. Thus, the disclosed method has the disadvantages of not being generally suitable for automatic, de novo detection of the physical topology of any type of network.

The recently accepted standard RFC2108 describes a system for detecting the network topology. The system features a central evaluation unit which retrieves passively collected information concerning addresses which were "heard" by various network elements. This information is potentially available from network devices such as repeaters, bridges, and switches, if these network devices are modified according to the standard. However, if the network devices have not been so modified, or if the information is not available due to security or other reasons, then this standard cannot be implemented for mapping the topology of the network.

A more useful system and method would permit such automatic, de novo detection of the physical topology of a network without resorting to specialized hardware devices, and without requiring the network topology to be at least partially determined before the system and method would be operable. Such a system and method would also determine the physical topology by starting with the computers connected to the network as the basic unit of the topology, thereby focusing upon the connections to each computer rather than to other, different types of network elements. Unfortunately, such a system and method is not currently available.

There is thus a need for, and it would be useful to have, a system and a method for automatic, de novo detection of the physical topology of a network without requiring specialized hardware devices and without requiring a partial determination of the network topology in advance, which would focus upon computers connected to the network as the basic unit of the network topology, and which would be useful for the maintenance of the detected physical network topology as well.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

Figure 1:
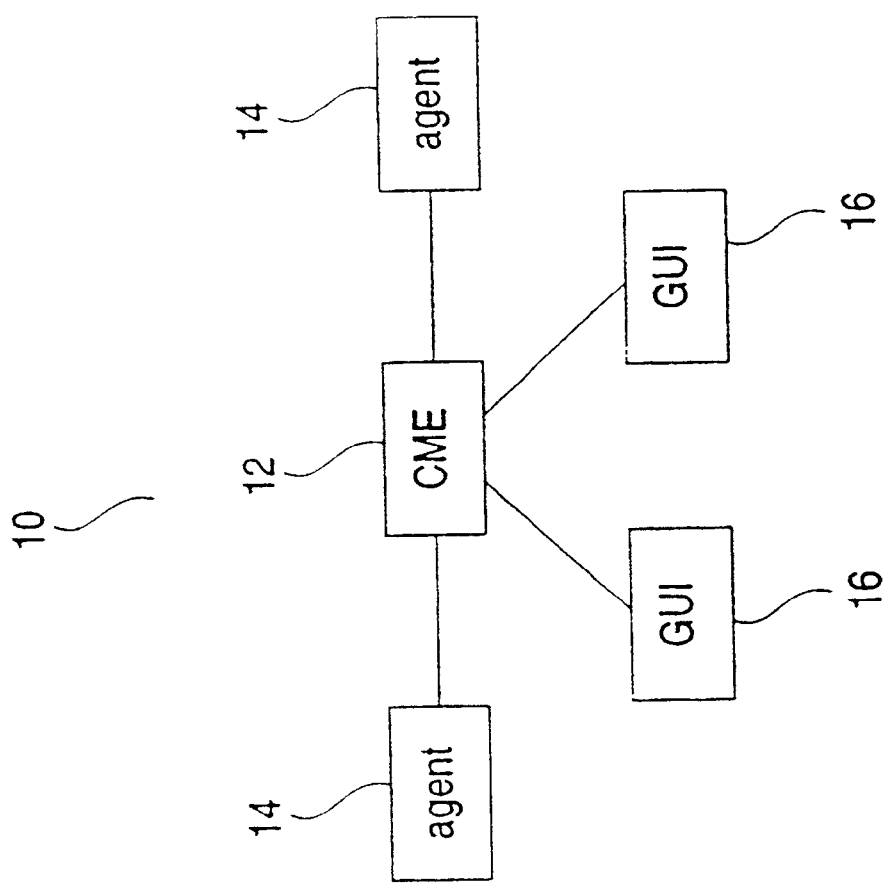
FIG. 1 is a schematic block diagram of an illustrative system according to the present invention.

The present invention is of a system and a method for automatic detection of physical network topology, by correlating information from computers connected to the network. Preferably, this information is gathered through the operation of a plurality of agents, which are distributed throughout the network and which are operated by a computer connected to the network. More preferably, the agents exchange information in order to at least partially determine the physical topology of the network. In addition, information is preferably gathered from other sources of physical topology information, such as bridging tables from network switches. The physical topology is preferably built by first determining the relative location of the agents, such as the segment of the network on which the agent is located. Next, switches and other connectivity elements are added in order to connect these segments, and additional segments are created from other sources of information. The remaining connections are then determined. Thus, the method and system of the present invention enable the map of the physical topology of the network to be automatically constructed.

According to the present invention, there is provided a system for automatic physical topology detection of a plurality of network elements on a network, comprising: (a) a plurality of agents, each of the plurality of agents being operated by a network element, at least a portion of the plurality of agents receiving at least one received message, such that each of the plurality of agents receiving the at least one received message is a receiving agent, the receiving agent analyzing the at least one received message to determine a source address of the at least one received message; and (b) a central management engine (CME) for obtaining the source address of each received message, for determining a relative location of each of the receiving agents according to the source address of each received message, and for determining a physical topology map of the network according to at least the relative location of each of the receiving agents.

According to another embodiment of the present invention, there is provided a system for automatic physical topology detection of a network, comprising: (a) a plurality of computers connected to the network, each of the plurality of computers having a network connector device for connecting to the network; (b) a plurality of agents for exchanging messages in order to determine a relative location of each of the plurality of agents to a remainder of the plurality of agents, the plurality of agents being distributed throughout the network, each of the plurality of agents being operated by one of the plurality of computers; and (c) a central management engine (CME) for determining a physical topology map of the network according to at least the relative location of each of the plurality of agents.

According to yet another embodiment of the present invention, there is provided a method for determining a physical topology map of a network, the network featuring a plurality of segments, the method comprising the steps of: (a) providing a plurality of agents distributed through the network; (b) identifying a friend agent for at least one of the plurality of agents; (c) mapping a segment containing the friend agent for the at least one of the plurality of agents to obtain mapping information; and (d) correlating the mapping information to determine the physical topology map of the network.

According to still another embodiment of the present invention, there is provided a method for determining a physical topology map of a network connecting a plurality of network elements, the network featuring a plurality of segments organized into at least one sub-network, the method comprising the steps of: (a) providing a plurality of agents distributed through the network; (b) selecting one of the plurality of agents as an anchor agent; (c) testing the plurality of agents with a test by the anchor agent; (d) assigning a friend agent to at least a portion of the plurality of agents according to the test by the anchor agent in order to form pairs of friend agents; (e) exchanging test frames between the friend agents; (f) mapping each of the plurality of segments according to the test frames exchanged between the friend agents to form mapped segments; and (g) mapping the physical topology map of the network according to the mapped segments.

Hereinafter, the term "network" refers to a connection between any two computers which permits the transmission of data. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system, including operating systems such as Windows CE™ for embedded systems, including cellular telephones, handheld computational devices and palmtop computational devices, and any other computational device which can be connected to a network. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., U.S.A.).

The term "relative location" of two network elements refers to the logical placement of the two elements within the network in relation to each other, rather than according to any fixed physical location in the network.

Hereinafter, the term "section" refers to any portion of a network, including but not limited to, a segment and a sub-network.

Hereinafter, the term "user" is the person who operates the graphical user interface and interacts with software implemented according to the present invention.

The present invention could be described as a series of steps implemented by a data processor, such that the present invention could be implemented as hardware, software or firmware, or a combination thereof. For the present invention, a software application could be written in substantially suitable programming language, which could easily be selected by one of ordinary skill in the art. The programming language chosen should be compatible with the computer by which the software application is executed. Examples of suitable programming languages include, but are not limited to, C, C++ and Java.

DETAILED DESCRIPTION OF THE INVENTION

The present invention is of a system and a method for automatic detection of physical network topology, by correlating information from computers connected to the network. Preferably, this information is gathered through the operation of a plurality of agents, which are distributed throughout the network and which are operated by a computer connected to the network. More preferably, the agents exchange information in order to at least partially determine the physical topology of the network. In addition, information is preferably gathered from other sources of physical topology information, such as bridging tables from network switches. The physical topology is preferably built by first determining the relative location of the agents, such as the segment of the network on which the agent is located. Next, switches and other connectivity elements are added in order to connect these segments, and additional segments are created from other sources of information. The remaining connections are then determined. Thus, the method and system of the present invention enable the map of the physical topology of the network to be automatically constructed.

The principles and operation of a method and system according to the present invention may be better understood with reference to the drawings and the accompanying description, it being understood that these drawings are given for illustrative purposes only and are not meant to be limiting.

Referring now to the drawings, FIG. 1 is a schematic block diagram of software modules in a system 10 for automatic physical network topology detection. System 10 features a central management engine (CME) 12, which is a package of software modules operated by a computer in the network. CME 12 receives information from a plurality of agents 14, which are software modules operated by other computers in the network. These other computers communicate with the computer operating CME 12, such that agents 14 are able to send information to, and receive instructions from, CME 12. As described in greater detail below with regard to FIG. 3B, preferably agents 14 are distributed through the network such that the information collected by agents 14 enables CME 12 to determine the physical topology map of the network. However, such a distribution is not necessarily determined according to any pre-existing knowledge or information about the network. Indeed, if the physical topology of the network is not fully mapped because of inadequate distribution of agents 14, the distribution of agents 14 can optionally be performed again or else more agents 14 can optionally be distributed.

More preferably, as described in greater detail below, agents 14 communicate with each other, in addition to communicating with CME 12. Such inter-agent communication enables agents 14 to collect information about the physical topology of the network from interactions with other agents 14, rather than relying solely on the instructions of CME 12. Thus, although CME 12 could optionally direct all aspects of the communication of agents 14 in order to determine the physical topology map of the network, preferably agents 14 communicate with each other at least quasi-independently.

CME 12 also preferably incorporates information about the physical topology of the network which is obtained from other sources, for example bridging table information from switches. The bridging table information is obtained with SNMP (simple network management protocol) commands for example. Other types of information are available through different protocols for communicating with network hardware components, and are described in greater detail below.

System 10 also preferably features at least one, and preferably a plurality of, graphical user interfaces 16 for interaction between the user and CME 12. Graphical user interface 16 displays the completed physical topology map to the user, as well as accepting instructions from the user to send to CME 12. Even without graphical user interface 16, however, the information about the physical topology map could still be displayed to the user through other display mechanisms.

Figure 2:
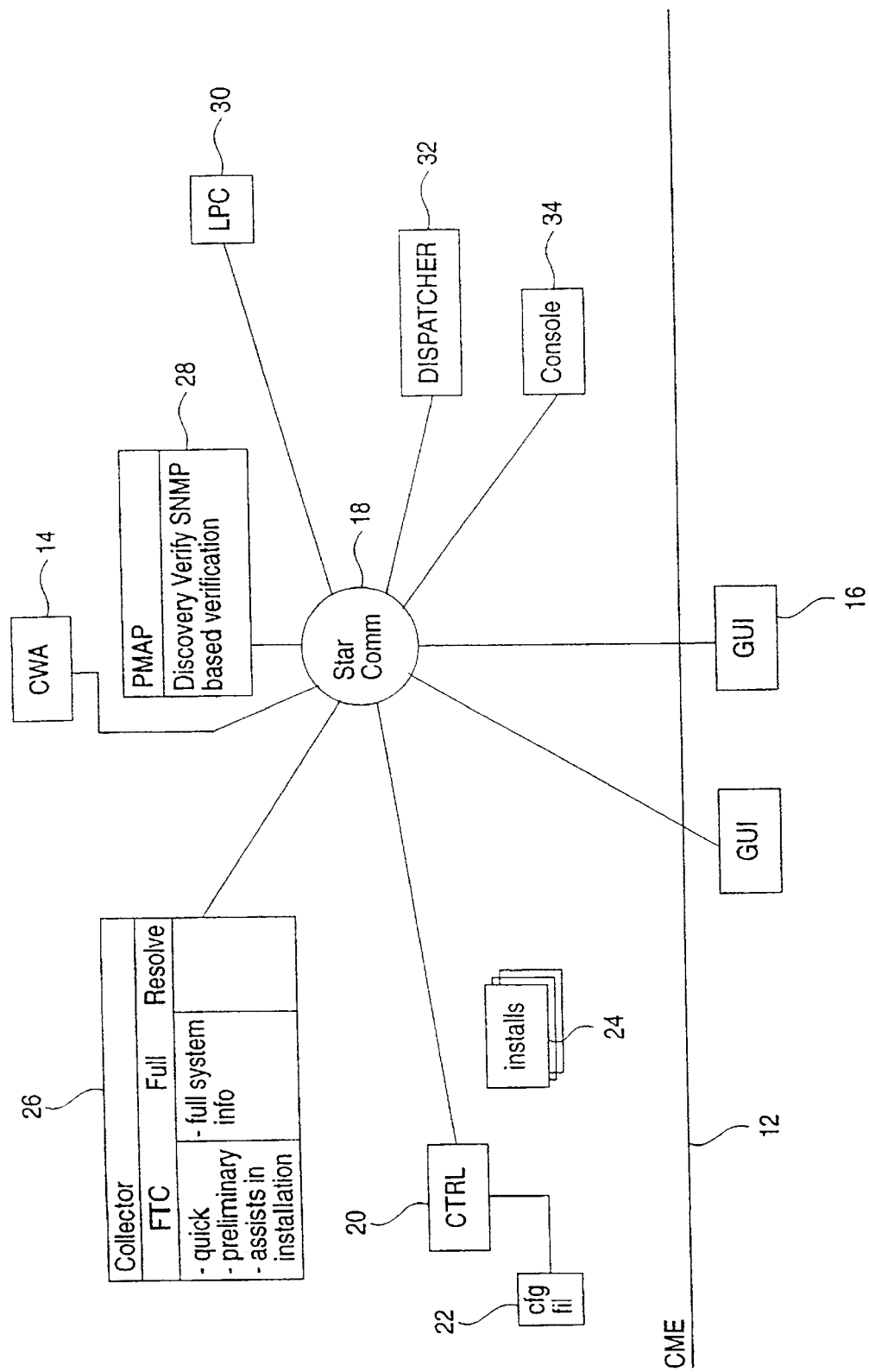
FIG. 2 is a schematic block diagram of an illustrative central management engine of FIG. 1.

FIG. 2 shows one exemplary implementation of CME 12 of FIG. 1 in more detail. It is understood that this particular implementation is preferred but is for the purposes of illustration only and is not intending to be limiting in any way. Other configurations of CME 12 are possible and are contemplated as being within the scope of the present invention. It is also understood that each process is a function of CME 12 which is described separately for the sake of discussion only, such that these processes could be implemented as a single software application. In addition, naming each process separately is also for the purposes of clarity, and is not intended to limit the functionality associated with each process to that particular named process alone.

As shown, CME 12 features a plurality of software modules which preferably communicate through a central communication server 18. Central communication server 18 is the communication layer for CME 12 and enables communications to be passed within CME 12 to the correct software module or modules. For example, graphical user interface 16 also communicates with CME 12 through central communication server 18.

Agents 14 preferably communicate directly with each module of CME 12 as necessary. For example, agents 14 specifically send events to a CWA process 19. More preferably, agents 14 determine when to communicate with CWA process 19, such that neither CWA process 19 nor CME 12 polls agents 14. Instead, CWA process 19 waits passively for agents 14 to initiate such communication. More preferably, if a particular agent 14 does not initiate communication after a predetermined period of time in order to send a "stay alive" signal, CWA process 19 assumes that agent 14 is no longer functioning, but still does not poll that particular agent 14. Instead, as described in greater detail below, another component of CME 12 preferably activates another agent 14, if possible, in order to compensate for the non-functioning agent 14.

Overall control for the functions of CME 12 is provided by a control process 20. Control process 20 also reads a configuration file 22 for both user-determined and system-dependent configuration parameters, in order to control the functions of CME 12 according to these parameters. Control process 20 reads a configuration file 22 in order to control the functions of the components of CME 12 and in order to initiate the functioning of CME 12. Control process 20 also monitors the functions of CME 12, and through CME 12, the functions of other components of system 10 such as agents 14. If these components do not behave properly, control process 20 can stop the functions of CME 12. Control process 20 also is responsible for the remote installation of agents 14, shown as a plurality of installation processes 24.

Another software module which is connected to central communication server 18 and which is controlled by control process 20 is a collector 26. Collector 26 collects information about the network from agents 14 (not shown) and from other sources. This information includes specific information about each network element connected to the network, including but not limited to, a name of the element, IP and MAC address of the element, an operating system type and version (for network elements which are computers), the type and version of the interface card, and other information specific to each network element.

Collector 26 performs three different phases of information collection. In the first phase, which occurs the first time that information about the network is collected, collector 26 assists in the installation of agents 14 throughout the network. Such assistance includes, for example, the recommendation of computers in the network on which agents 14 should be installed. This recommendation could optionally be based upon existing databases in the network, such as the databases of DNS (domain name server) and NIS/NIS+ servers, or through IP scanning or other methods.

In the next phase, which is the full network discovery, collector 26 collects information from agents 14 in order to discover all machines on the network, including computers and other network elements. In addition, preferably collector 26 collects other types of information through other protocols. This phase is described in greater detail below with regard to FIGS. 3A and 3B.

The third phase is the resolving process, which occurs when collector 26 receives a query about a new network element and must gather the necessary information in order to add the new network element to the existing physical topology map of the network.

A PMAP module 28 creates the actual physical topology map, in conjunction with collector 26, for the second and third phases of the initial building of the map. In addition, PMAP module 28 also maintains the map of the physical topology, for example by receiving updated information from agents 14 or through a query of SNMP information stored in network elements such as bridging tables. PMAP module 28 stores the physical topology map in an associated database (not shown).

According to a preferred embodiment of the present invention, PMAP module 28 controls the functioning of agents 14 when multiple agents 14 are present on a single network segment. If a plurality of agents 14 are present on one network segment, then these agents 14 can only hear the same traffic, which is less useful for the determination of the network topology. PMAP module 28 therefore preferably requests only one agent 14 per network segment to send information to CWA process 19 concerning the network topology. If there are a plurality of such agents 14 on a single network segment, however, and the particular agent 14 which is currently communicating with CME 12 ceases functioning, then PMAP module 28 preferably activates a different agent 14 on that network segment to begin reporting information to CWA process 19.

An LPC process 30 performs a logical to physical correlation, according to traffic information received from agents 14, in order to determine if any changes may have occurred in the physical topology of the network. The term "traffic information" refers to logical information concerning the flow of packets through the network. This logical information is then compared to the physical topology map of the network. If the physical topology and logical packet flow information do not correlate, and in particular if there are gaps in the logical packet flow information which should not occur according to the physical topology map, then LPC process 30 instructs agent 14 to send test packets. One or more agents 14 can receive one or more of these packets, thereby deducing whether the physical topology of the network has changed. Thus, the correlation of the logical and physical topology information by LPC process 30 enables changes to the physical topology map to be detected which would otherwise not be detected.

Additional software modules shown in FIG. 2 include a dispatcher 32, which propagates events within CME 12. Dispatcher 32 receives a subscription request from each of the other software modules of CME 12, to be notified when a particular event occurs. Dispatcher 32 then monitors events through central communication server 18 and, in conjunction with central communication server 18, notifies the subscribing software module when the event occurs.

In addition, a console module 34, also shown in FIG. 2, constructs messages to be sent to the user through graphical user interface 16. These messages can include an alarm if one or more components of system 10 are not functioning properly, and so forth.

Figure 3A:
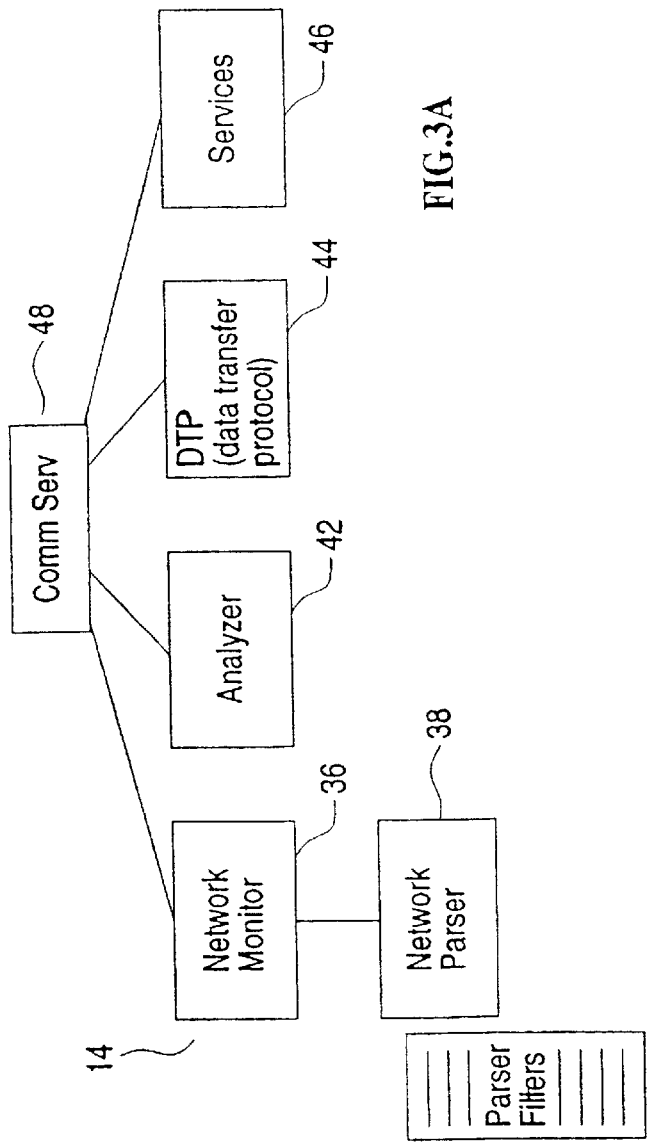
FIG. 3A illustrates an exemplary embodiment of an agent of FIG. 1 according to the present invention.
Figure 3B:
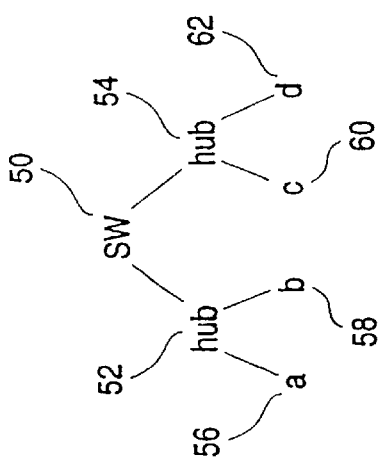
FIG. 3B is a schematic diagram of a portion of a network.

FIGS. 3A and 3B describe preferred features of agents 14 and the functions of agents 14 for determining the physical topology map of the network. It is understood that this particular implementation of agents 14 is preferred but is described for the purposes of illustration only and is not intending to be limiting in any way. Other configurations of agents 14 are possible and are contemplated as being within the scope of the present invention. Furthermore, different configurations of agents 14 could be operative with the configuration of CME 12 as described in FIG. 2.

FIG. 3A shows a schematic block diagram of an exemplary configuration of the architecture of agent 14 according to the present invention, preferably embodied as a software module being operated by a computer. Optionally and preferably, agent 14 is operated by any type of end node device. As shown, agent 14 features a network monitor 36 which interacts with the network card, or other network connector hardware device, of the computer which operates agent 14. Network monitor 36 both detects any information received through the network card, and is able to instruct the network card to operate in promiscuous mode. In promiscuous mode, the network card receives all packets traveling through the network segment, even if these packets are not specifically addressed to that particular network card itself. As described in further detail with regard to FIG. 3B below, the monitoring of all network traffic in promiscuous mode is important for the determination of the physical network topology through the communication of agents 14.

The information which is received by network monitor 36 is then sent to a network parser 38, which filters the data according to at least one parser filter 40. Network parser 38 sorts each frame of the received network traffic through parser filter 40 according to at least one characteristic of the frame, such as the destination address, type of frame, protocol according to which the data is sent, and so forth. In addition, network parser 38 also preferably collects all test packets which are sent for the determination of network topology, which are recognized according to information in the header. Network parser 38 then summarizes the sorted data, which is stored in an associated database (not shown). The stored data enables network parser 38 to recognize frames with a known source address or a known destination address.

After agent 14 has finished mapping the segment, and if network parser 38 then captures a frame with an unknown source and/or destination address, network parser 38 passes this frame to an analyzer 42. Analyzer 42 then examines this frame and updates the associated database to add the information about the new source or destination address, or both. Analyzer 42 also sends an event to CME 12 (not shown), to indicate that a new source or destination network element (or both) has been discovered. As described in greater detail previously, the discovery of such a new machine on the network preferably triggers the process of examining the new machine in order to collect more network information about the new machine for the resolving process by collector 26. The event itself is sent to CME 12, and in particular to collector 26, which performs the resolving process (not shown).

In addition, preferably a DTP (data transfer protocol) daemon 44 is used to send large amounts of data, other than events, to CME 12. DTP daemon 44 operates according to a TCP-based protocol for transferring data to CME 12, in particular for sending data to PMAP module 28. This data preferably includes the lists of agents which are disqualified to be "friends", generated during the physical topology discovery process, as described in greater detail below with regard to FIG. 3B. Although DTP daemon 44 is described as a "daemon", this is not intended to be limiting in any way, since DTP daemon 44 could be any type of process for transferring data to CME 12, additionally including but not limited to electronic mail (e-mail).

As noted previously, according to a preferred embodiment of the present invention, described with regard to FIG. 3B below, part of the process for discovering the physical topology of the network includes test packet transmission from one agent 14 to another agent 14. A service module 46 sends these test packets, for example through the ICMP echo command, also known as the "Ping" software utility, available on many operating systems, for sending such test packets to a specified destination address. Of course, other such utilities could be used for sending test packets by service module 46.

Overall control of agent 14 is preferably performed by a communication service module 48, which listens to a special port for commands from CME 12. These commands might include, for example, a command to begin collecting and transmitting information, or alternatively a command to stop such transmission, as previously described. Communication service module 48 receives each such command and parses the command in a format for agent 14. Communication service module 48 then alters the function of one or more of the modules of agent 14 according to the received command.

The method of the present invention for gathering data on the physical topology of the network through communication between agents is described with reference is also made to FIG. 3B, which is a schematic block diagram of an example of a portion of a network connecting a plurality of network elements.

In step one of the method of the present invention, an anchor agent is located. This anchor agent could simply be the first agent in a list of agents, for example. In step two, the anchor agent sends a broadcast frame with particular identification information to identify itself as the anchor. In step three, each agent which receives this broadcast frame sends test frames to the computer operating the anchor agent. Each agent which receives the broadcast frame is assumed to be in the same routed sub-network, or IP sub-network, as the anchor agent. Substantially simultaneously, each agent which receives the frame also listens for the reply frames from other agents.

In step four, all agents which captured one or more of these frames are disqualified to be a "friend" of the agent which sent the captured frame, since these agents are suspected to be located on the same segment which sent the captured frame. In order for a first agent to be a friend of the second agent, the two agents must be located on different segments of the network, since the agent friends are used to at least partially determine the topology of the network by exchanging packets. If two agents are located on the same segment, no further information can learned from this exchange of packets, and hence the agents cannot be friend agents for this phase of the topology mapping.

In step five, a disqualification list is created. The disqualification list is a list of agents from which each agent was able to hear a test frame, and hence for which each agent is disqualified as a friend agent for this phase of the topology mapping.

In step six, this list of disqualified agents is sent back to the CME. The CME, and preferably the PMAP module within the CME, then assigns a friend agent to each agent where possible in step seven. By the end of this step, effectively the sub-network has been divided into segments according to the list of disqualified agents. If possible, each segment should have one agent which has a friend agent on at least one other segment for exchanging frames in order to map the topology of the sub-network. More preferably, each pair of friend agents should be located on the same routed sub-network, unless a particular routed sub-network does not have two such agents on different segments. In that case, the friend agents can belong to different routed sub-networks.

Preferably, in step eight, the pairs of "friend" agents test each other in order to ensure that they should not be disqualified as "friend" agents by being located on the same segment. This process is also preferably performed if a new agent appears, by selecting another agent at random and then testing to see if the new agent is on the same segment as the selected agent.

Also more preferably, in step nine, the PMAP module stimulates each network interface of any machine which was not previously mapped, in order to be certain that other agents can capture frames from such a machine.

In step ten, each agent receives at least a first friend agent assignment. In step eleven, these two agents exchange frames. For example, as shown with regard to FIG. 3B, a switch 50 has a first hub 52 and a second hub 54. First hub 52 has two computers, a first computer 56 with an agent "A" and a second computer 58, labeled as "B". Second hub 54 also has two computers, a third computer 60 with an agent "C", and a fourth computer 62, labeled as "D". For the following discussion, when reference is made to an agent only, it is understood that the messages are sent from, and received by, each computer operating the particular agent. For the purposes of discussion only, agent "A" is assumed to be a friend agent of agent "C". Agent "A" sends a frame to second computer 58 according to the request of agent "C". If agent "C" can hear the frame, then agent "C" is on the same segment as second computer 58.

Next, agent "C" sends a frame to second computer 58 according of agent "A", to determine if agent "A" can hear that frame. If agent "A" can hear the frame, then agent "A" is on the same segment as second computer 58. This step is repeated until all friend agents have exchanged frames, thereby enabling each agent to map its own segment.

In step twelve, a friend agent is assigned to the anchor agent so that the anchor agent can map its own segment. In step thirteen, if there are still agents which are unmapped, then a friend agent is assigned to each unmapped agent in order to remap that segment. For steps twelve and thirteen, since most agents have already been mapped in mapped segments, the disqualification list is optionally disregarded for determining the assignment of friend agents. Preferably, mapped agents are used as friend agents for unmapped agents.

In step fourteen, all unmapped agents are again examined in order to map more of these agents. All of the mapping data is then sent to the CME.

According to preferred embodiments of the present invention, provision is made for special situations which require additional steps in order to map the segments. For example, if there are not any mapped segments in a given sub-network from the previous phase, then one of two situations may be true. In the first situation, all of the agents are in the same segment as the anchor agent. In the second situation, all of the agents are in one segment, but the anchor agent is in a different segment. The first situation can be resolved by using an agent from another sub-network as the friend agent to the anchor agent. The second situation can be resolved by using one of agents in the one segment as a friend agent to the anchor agent.

In order to determine which of the two situations is correct, preferably the following test is performed. First, all other agents are instructed to listen for a frame which is sent from the anchor agent (as the source address) to an arbitrary machine which has no agent (as the destination address). The actual physical location of this arbitrary machine is not important. Next, the anchor agent actually sends this frame. All agents which did not capture this frame are assumed to be located together in the same segment.

Next, the anchor agent is instructed to listen for a frame which is sent from another agent "X1" (as the source address) to the previous machine which has no agent (as the destination address). Agent "X1" then actually sends such a frame. If the anchor agent did not capture this frame, it is assumed to be located in a different segment from the agent "X1".

In step fifteen, once the mapping of the sub-network is complete, the preceding steps are repeated for agents which did not hear the broadcast frame, in order to map other routed sub-networks of the network. It should be noted that the other sub-networks can be mapped either sequentially, after the first sub-network has been mapped, or else in parallel to the process of mapping the first sub-network. Once all sub-networks have been mapped, the agents are examined to see if any unmapped agents remain. If such unmapped agents exist, then these unmapped agents are preferably mapped by selecting a friend agent from another sub-network.

According to another preferred embodiment of the method of the present invention, agents determine their own friends by listening to the network traffic and/or by broadcasting frames and waiting for responses. The CME would thus only receive the final data, and not the interim reports about whether such broadcast frames were received by any particular agent. More preferably, agents could determine their own friend agents without the anchor agent. For example, agent "A" could listen to a broadcast packet from the CME in order to detect other agents which may be in the same segment. If an agent "B" is initially found to be in a different segment, agent "A" could then test whether agent "B" is in the same segment and so determine its own friend agent, without the anchor agent.

According to yet another preferred embodiment of the method of the present invention, frames are "spoofed" by changing the IP address of the frame, such that frames appear to be sent from a different source than the actual originating machine. For this embodiment of the present invention, a machine is selected which is not in the same segment as the computer operating the agent. For example, agent "A" could send a spoofed frame to agent "B", which would appear to have originated from another computer "C". Agent "B" would then reply to computer "C", according to the IP address of the spoofed frame. If agent "A" does not hear the reply of agent "B", then neither the computer operating agent "B" nor computer "C" is in the same segment as the computer operating agent "A". Next, suppose agent "A" sends a frame to agent "B" which is spoofed, such that the frame appears to have originated from a computer "D". Agent "B" then replies to computer "D". If agent "A" hears the reply, then agent "A" is on the same segment as computer "D". Thus, by using the pair of agents "A" and "B" in this process of triangulation with spoofed frames, one pair of agents can optionally be used to map an entire segment.

According to an alternative embodiment of the method of the present invention, the PMAP module could optionally send out all of the frames to different agents in the network. The PMAP module could sequentially select a single agent in turn to which a frame is sent. Other agents would then listen to see if they could detect this frame. This embodiment has the disadvantage of placing a heavier computational load on the CME, however, as well as loading the entire network with frames for mapping each segment. Thus, this embodiment is not as preferred as the embodiment described previously.

Figure 4B:
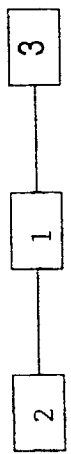
FIGS. 4A–4D are schematic block diagrams for detecting connectivity elements according to the present invention.
Figure 4A:
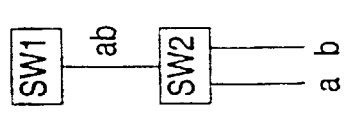

Once the CME has gathered all of the mapping information about mapped segments from the agents, in the next stage of the mapping process, SNMP information is gathered. First, the bridging table from each switch is obtained by using SNMP commands. This information enables the PMAP module to determine which machine switch hears other switches. For example, a switch may have an address belonging to another switch. As another example, if a first switch hears two machines "a" and "b" on two different ports, but a second switch hears the two machines on only one port, then there is a connection between the first and second switches, as shown in FIG. 4A. All of this information is used to locate switches or other connectivity elements within the network.

Redundant switches are then removed. For example, as shown in FIG. 4B, if a first switch hears a second switch on one port and a third switch on another port, while the second switch hears both the first and third switches on one port, then presumably the first switch is located between the second and third switches.

Figure 4D:
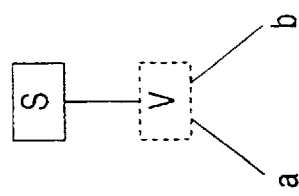
Figure 4C:
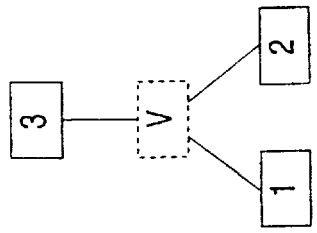

As shown in FIG. 4C, the existence of a connectivity element can be deduced, even if the identity of such an element is not known, by determining that two switches can both hear each other and a third switch on one port. These two switches must therefore have some type of virtual connectivity element connecting them, shown as a box labeled "v".

Switches are then connected to segments according to the bridging table data and according to the mapping data obtained previously from the agents. Additional connectivity elements may be added at this stage which were not detected earlier. For example, if two agents are on the same routed sub-network, then there must be a connectivity element which connects these agents within the routed sub-network. Similarly, as shown in FIG. 4D, if a switch "s" hears two machines "a" and "b" on one port, but machines "a" and "b" have been determined to be on two different segments, then there must be a connectivity element "v" which connects these machines.

Routed sub-networks are then connected to each other according to routing information deduced by the CME. The remaining connections are presumed to be cables, rather than connections through connectivity elements. The physical topology map is now complete and features connections between all network elements.

According to another preferred embodiment of the present invention, the physical topology map is optionally updated through either an SNMP update, an agent update or both. Preferably, the map is continuously updated by updating only a portion of the map when a change is detected, rather than redoing the entire physical topology mapping process. In this sense, the physical topology map is preferably updated "on-the-fly" through such continuous monitoring of the network.

For the SNMP update, periodically the CME gathers the bridging table information from the switches with SNMP commands. This information may be mistaken, however, so preferably any changes to the physical topology map are first tested before they are implemented. For example, preferably a new computer is detected only if the new computer is not heard on a non-uplink port. Preferably, localized SNMP information is only gathered for a portion of the network.

More preferably, the CME gathers SNMP information, such as the bridging table information, continuously while stimulating the network interface of at least one network element. This preferred feature overcomes a problem which may be encountered if the switch "forgets" at least a portion of the bridging table information before this information can be collected by the CME.

For the agent update, preferably a new computer is only registered as such after the agent which mapped that computer can no longer hear traffic from that computer. Next, more preferably both SNMP and routing information are used to resolve the location of this new computer. If a new agent is detected, then preferably the PMAP module instructs both agents to perform a remapping of the segment.

It will be appreciated that the above descriptions are intended only to serve as examples, and that many other embodiments are possible within the spirit and the scope of the present invention.

What is claimed is:

1. A system for automatic physical topology detection of a plurality of network elements on a network, comprising:
 (a) a plurality of agents, each of said plurality of agents being operated by a network element, said network element being an end node, wherein said end node operating each of said plurality of agents is a computer and each of said plurality of agents is a software module, said computer being connected to the network through a network connector device, at least a portion of said plurality of agents receiving at least one received message, such that each of said plurality of agents receiving said at least one received message is a receiving agent, said receiving agent analyzing said at least one received message to determine a source address of said at least one received message, each agent comprising:
  (i) a network monitor for binding to said network connector device of said computer and for detecting information received by said network connector device;
  (ii) a network parser for filtering said information detected by said network monitor according to at least one characteristic of said information; and
  (iii) a data transfer module for transferring said information to said CME; and
  (iv) a database for storing a list of known source addresses and known destination addresses for said information, such that if at least one of a source address or a destination address of said information is not known, said data transfer module sends an event to said CME with said unknown address; and
 (b) a central management engine (CME) for obtaining said source address of each received message, for determining a relative location of each of said receiving agents according to said source address of each received message, and for determining a physical topology map of the network according to at least said relative location of each of said receiving agents.

2. A system for automatic physical topology detection of a plurality of network elements on a network, comprising:

(a) a plurality of agents, each of said plurality of agents being operated by a network element at least a portion of said plurality of agents receiving at least one received message, such that each of said plurality of agents receiving said at least one received message is a receiving agent, said receiving agent analyzing said at least one received message to determine a source address of said at least one received message; and (b) a central management engine (CME) for obtaining said source address of each received message, for determining a relative location of each of said receiving agents according to said source address of each received message, and for determining a physical topology map of the network according to at least said relative location of each of said receiving agents; and (c) a connectivity element for connecting at least two of said network elements, wherein said CME receives connectivity information from said connectivity element for further determining said physical topology map of the network and wherein said connectivity element is a switch and said connectivity information is bridging table information;

wherein the network is divided into a plurality of segments, such that said relative location of each of said plurality of agents is either on a same segment as another of said plurality of agents or on a different segment as another of said plurality of agents.

3. The system of claim 2, wherein said connectivity information is obtained according to SNMP (simple network management protocol) commands.

4. A system for automatic physical topology detection of a plurality of network elements on a network, comprising:

(a) a plurality of agents, each of said plurality of agents being operated by a network element, at least a portion of said plurality of agents receiving at least one received message, such that each of said plurality of agents receiving said at least one received message is a receiving agent, said receiving agent analyzing said at least one received message to determine a source address of said at least one received message; and (b) a central management engine (CME) for obtaining said source address of each received message, for determining a relative location of each of said receiving agents according to said source address of each received message, and for determining a physical topology map of the network according to at least said relative location of each of said receiving agents;

wherein said CME features a CWA process for communicating with each of said plurality of agents, said CWA process passively waiting for a communication from each of said plurality of agents, such that if said CWA process fails to receive said communication within a set period of time from a non-responding agent, said CME activates an additional agent to replace said non-responding agent.

5. The system of claim 4, wherein said CME further features a PMAP process for activating only one agent per segment, such that said PMAP process activates said additional agent to replace said non-responding agent.

6. A method for determining a physical topology map of a network, the network featuring a plurality of sections, the method comprising the steps of:

(a) providing a plurality of agents distributed through the network;

(b) identifying a friend agent for at least one of said plurality of agents, comprising the steps of:
  (i) selecting a first of said plurality of agents as an anchor agent;
  (ii) sending a broadcast frame from said anchor agent to said plurality of agents;
  (iii) sending a broadcast frame by each of said plurality of agents receiving said broadcast frame; and
  (iv) identifying each of said plurality of agents as a receiving agent receiving at least one of said broadcast frames, such that said receiving agent is disqualified as a friend agent for a sending agent sending said broadcast frame;

(c) mapping a section containing said friend agent for said at least one of said plurality of agents to obtain mapping information, wherein each boundary of the plurality of sections is not known before said plurality of agents is distributed through the network, and wherein each section is a segment of the network; and (d) correlating said mapping information to determine the physical topology map of the network.

7. A system for automatic physical topology detection of a network, comprising:

(a) a plurality of computers connected to the network, each of said plurality of computers having a network connector device for connecting to the network;

(b) a plurality of agents for exchanging messages in order to determine a relative location of each of said plurality of agents to a remainder of said plurality of agents, said plurality of agents being distributed throughout the network, each of said plurality of agents being operated by one of said plurality of computers; and (c) a central management engine (CME) for determining a physical topology map of the network according to at least said relative location of each of said plurality of agents.

8. A method for determining a physical topology map of a network connecting a plurality of network elements, the network featuring a plurality of segments organized into at least one sub-network, the method comprising the steps of:

(a) providing a plurality of agents distributed through the network;

(b) selecting one of said plurality of agents as an anchor agent;

(c) testing said plurality of agents with a test by said anchor agent;

(d) assigning a friend agent to at least a portion of said plurality of agents according to said test by said anchor agent in order to form pairs of friend agents;

(e) exchanging test frames between said friend agents;

(f) mapping each of the plurality of segments according to said test frames exchanged between said friend agents to form mapped segments; and (g) mapping the physical topology map of the network according to said mapped segments.

9. The method of claim 8, wherein step (c) further comprises the steps of:

(i) sending a broadcast frame by said anchor agent to said plurality of agents;

(ii) for each of said plurality of agents receiving said broadcast frame, sending a test frame to said anchor agent;

(iii) listening by each of said plurality of agents receiving said broadcast frame for said test frame; and (iv) disqualifying each of said plurality of agents receiving said test frame as a friend agent for a sending agent sending said test frame, such that a receiving agent receiving said test frame is a disqualified agent;

wherein step (d) is performed such that said friend agent is not said disqualified agent.

10. The method of claim 9, wherein step (d) further comprises the step of:

(i) testing each pair of friend agents to determine whether said friend agent is not disqualified.

11. The method of claim 10, wherein a pair of friend agents is a first agent and a second agent, wherein the plurality of network elements includes a receiving network element and wherein step (i) is performed according to the steps of:

(1) sending a frame from a first agent to said receiving network element; and (2) listening for said frame by said second agent, such that if said second agent hears said frame, said second agent and said first agent are disqualified as friends.

12. The method of claim 10, wherein a pair of friend agents is a first agent and a second agent, and wherein step (i) is performed according to the steps of:

(1) providing a central management engine connected to the network for sending frames to all of said plurality of agents;

(2) sending a frame from said central management engine to said first agent; and (3) listening for said frame by said second agent, such that if said second agent hears said frame, said second agent and said first agent are disqualified as friends.

13. The method of claim 9, wherein an unmapped network element has a network interface for connecting to the network and step (f) further comprises the step of:

(i) stimulating said network interface to send a frame to determine if at least one agent can capture said frame from said unmapped network element.

14. The method of claim 13, wherein step (f) further comprises the steps of:

(ii) continuously collecting SNMP information while said network interface is being stimulated in order to map said network element.

15. The method of claim 14, wherein the at least one sub-network is a plurality of sub-networks and step (f) further comprises the steps of:

(iv) alternatively, selecting an agent from a different sub-network as a friend agent for said anchor agent; and (v) mapping said segments with said anchor agent and said friend agent.

16. The method of claim 9, wherein the at least one sub-network is a plurality of sub-networks and wherein step (g) further comprises the step of repeating steps (a) to (f) for each of said plurality of sub-networks.

17. The method of claim 16, wherein step (g) further comprises the step of:

(i) gathering SNMP (simple network management protocol) information about at least one network element on the network.

18. The method of claim 17, wherein step (g) further comprises the step of locating at least one additional segment according to said SNMP information.

19. The method of claim 17, wherein step (g) further comprises the step of:

(ii) identifying at least one switch according to said SNMP information.

20. The method of claim 19, wherein step (g) further comprises the step of identifying a connection between two switches according to said SNMP information.

21. The method of claim 20, wherein step (g) further comprises the step of:

(iii) removing a switch if said switch is redundant.

22. The method of claim 21, wherein step (g) further comprises the steps of:

(iv) deducing an additional connectivity element for connecting the plurality of network elements; and (v) connecting said at least one switch and said additional connectivity element to at least one of the plurality of segments.

23. The method of claim 22, wherein the network includes at least a first switch, a second switch and a third switch, and step (iv) further comprises the steps of:

(1) hearing said first switch by said second switch on a port of said second switch;

(2) hearing said second switch by said first switch on a port of said first switch;

(3) hearing said third switch by said first switch on said port of said first switch; and (4) hearing said third switch by said second switch on said port of said second switch, such that said additional connectivity element is deduced.

24. The method of claim 22, wherein step (iv) further comprises the step of determining that a pair of agents are on a same routed sub-network, such that a connectivity element must connect said pair of agents.

25. The method of claim 22, wherein the network includes a switch and step (iv) further comprises the steps of:

(1) hearing a first network element and a second network element on a single port of said switch; and (2) determining that said first network element and said second network element are on two different segments of the network, such that a connectivity element must connect said first network element and said second network element to said single port of said switch.

26. The method of claim 25, wherein the at least one sub-network is a plurality of sub-networks and step (g) further comprises the step of:

(vi) connecting said plurality of sub-networks according to routing information.

27. The method of claim 26, wherein each of said plurality of agents is operated by a computer connected to the network.

28. The method of claim 27, wherein a pair of friend agents comprises a first agent being operated by a first computer and a second agent being operated by a second computer, and wherein step (f) comprises the steps of:

(i) providing a receiving computer connected to the network;

(ii) sending a frame from said first computer to said receiving computer according to a request from said second agent to said first agent, such that if said second computer hears said frame, said second computer and said receiving computer are located on a same segment; and (iii) sending a frame from said second computer to said receiving computer according to a request from said first agent to said second agent, such that if said first computer hears said frame, said first computer and said receiving computer are located on a same segment.

29. The method of claim 28, wherein step (f) is repeated for all pairs of friend agents.

30. The method of claim 29, further comprising the step of:
(h) updating the physical topology map.

31. The method of claim 30, wherein step (h) further comprises the steps of:
(i) receiving a frame having at least one of an unknown source address and an unknown destination address by a first agent; and
(ii) exchanging frames between said first agent, a friend agent of said first agent and a network element corresponding to said unknown address to map said network element.

32. The method of claim 31, wherein step (h) is performed on-the-fly.

33. The method of claim 32, wherein step (h) further comprises the steps of:
(iii) collecting SNMP information continuously to update the physical topology map.

34. The method of claim 8, wherein step (f) further comprises the steps of:
(i) assigning a friend agent to said anchor agent; and
(ii) mapping a segment of said anchor agent.

35. The method of claim 8, wherein if no mapped segments are formed, step (f) further comprises the steps of:
(i) testing said plurality of agents to determine if all of said plurality of agents, including said anchor agent, are located on a same segment;
(ii) if all of said plurality of agents are located on a segment and said anchor agent is located on a different segment, selecting one of said plurality of agents as a friend agent for said anchor agent; and
(iii) mapping said segments with said anchor agent and said friend agent.

36. A method for determining a physical topology map of a network connecting a plurality of network elements, the network featuring a plurality of sections, the plurality of sections being a plurality of segments, the method comprising the steps of:
(a) providing at least one agent distributed through the network, said at least one agent being operated by a network element connected to the network;
(b) assigning a plurality of friends to said at least one agent, wherein each friend is a network element;
(c) exchanging test frames between said at least one agent and each of said plurality of friends, such that an IP address of at least one of said test frames is different than an IP address of said network element operating said at least one agent;
(d) mapping each of the plurality of sections according to said test frames to form mapped sections, comprising the steps of:
(i) sending a test frame from said at least one agent to a first friend, said test frame having an IP address of a second friend;
(ii) sending a reply to said second friend by said first friend according to said test frame; and
(iii) listening for said reply by said at least one agent, such that if said at least one agent does not hear said reply, said network element operating said at least one agent is on a different segment than said first friend and said second friend; and
(e) mapping the physical topology map of the network according to said mapped sections.

* * * * *